United States Patent [19]

Brassell

[11] Patent Number: 4,772,508

[45] Date of Patent: Sep. 20, 1988

[54] ACTIVATED CARBON-CARBON COMPOSITE OF HIGH SURFACE AREA AND HIGH COMPRESSIVE STRENGTH

[76] Inventor: Gilbert W. Brassell, 13237 W. 8th Ave., Golden, Colo. 80401

[21] Appl. No.: 822,164

[22] Filed: Jan. 24, 1986

[51] Int. Cl.$^4$ .......................... B32B 7/02; B32B 9/00; B01D 46/00

[52] U.S. Cl. .................................... 428/218; 428/408; 428/409; 428/360; 428/367; 428/368; 423/447.4; 55/523

[58] Field of Search ............... 428/408, 218, 409, 340, 428/360, 367, 368; 423/447.1

[56] References Cited

U.S. PATENT DOCUMENTS

| | | |
|---|---|---|
| 2,546,903 | 3/1951 | Morrell ............................ 252/422 |
| 3,322,489 | 5/1967 | Moutaud et al. . |
| 3,671,385 | 6/1972 | Trent et al. . |
| 3,769,144 | 10/1973 | Economy et al. . |
| 3,871,841 | 3/1975 | Queiser et al. . |
| 3,986,835 | 10/1976 | Takagi . |
| 4,167,482 | 9/1979 | Mueller . |
| 4,285,831 | 8/1981 | Yoshida et al. . |
| 4,342,574 | 8/1982 | Fetzer . |
| 4,350,672 | 9/1982 | Layden, Jr. et al. . |
| 4,362,646 | 12/1982 | Ikegami et al. . |
| 4,397,907 | 8/1983 | Rosser et al. . |
| 4,425,407 | 1/1984 | Galasso et al. ................ 428/408 X |
| 4,444,574 | 4/1984 | Tradewell et al. . |
| 4,487,799 | 12/1984 | Galasso et al. ..................... 428/408 |
| 4,500,328 | 2/1985 | Brassell et al. ..................... 428/297 |
| 4,522,883 | 6/1985 | Wallace et al. ..................... 428/368 |

FOREIGN PATENT DOCUMENTS

| | | |
|---|---|---|
| 447698 | 1/1973 | Australia . |
| 3105887 | 2/1982 | Fed. Rep. of Germany . |
| 2228031 | 11/1974 | France . |

OTHER PUBLICATIONS

Chemical Abstracts, vol. 95, No. 5, Sep. 1981, pp. 107, 108, Abstract, No. 83015u, Columbus, Ohio, U.S.; and JP-A-81 44 039 (Toho Beslon Co., Ltd.) 23-04-1981.
Patent Abstracts of Japan, vol. 7, No. 91 (C-162), p. 1236, Apr. 15, 1983; & JP-A-58 20 705 (Mitsubishi Kasei Kogyo K.K.) 07-02-1983.
Fiber Materials, Inc. (FMI) Brochure and Leaflet 9/82.
Manvil Corporation, Microfiber Technology Laboratory Results Data Sheet 6/87.

*Primary Examiner*—P. C. Ives
*Attorney, Agent, or Firm*—Millen & White

[57] ABSTRACT

A carbon bonded carbon fiber composite having a surface area greater than about 10 $m^2/g$, and a compressive strength of about 20 psi or higher provides excellent filtering capacity in an activated carbon able to withstand heretofore intolerable environmental disturbances.

14 Claims, No Drawings

ACTIVATED CARBON-CARBON COMPOSITE OF HIGH SURFACE AREA AND HIGH COMPRESSIVE STRENGTH

BACKGROUND OF THE INVENTION

This invention relates to a new type of activated carbon having a high surface area necessary for many filtering applications but having a compressive strength in structured form which is exceptionally high.

An enormous amount of literature has developed over the years relating to a wide variety of types of activated carbon. The latter finds uses in a wide variety of applications, e.g., filtering (gases, particulates, liquid droplets), purifying, exchanging, etc., in both gaseous and liquid media. See, e.g., U.S. Pat. Nos. 4,397,907, 4,362,646, 3,322,489, 3,769,144, 4,342,574, 4,444,574, 3,871,841, 4,167,482, 3,986,835, 4,350,672, 3,671,385, and 4,285,831. In most of these applications, the activated carbon has a high surface area, e.g., 300–2,000 $m^2/g$ in order to maximize adsorption/absorption effects. Many methods are known for achieving increased surface area; see, e.g., U.S. Pat. Nos. 4,362,646 (especially columns 7 and 8) and 4,285,831 (especially columns 5–7). In the vast majority of cases, the activated carbon material has very low compressive strength, e.g., is in the form of a woven or non-woven fabric, a felt, powder, granulate, often sandwiched between porous substrates, etc. This poses significant problems in many environments, e.g., those wherein certain pressure drops can occur (explosions, violent weather conditions (tornados, etc.). Furthermore, this characteristic of activated carbon presents problems in packaging, replacing spent material, etc.

The molecular adsorption capacity of these conventional filter systems is determined primarily by the total surface area of the carbon per unit volume. In order to maximize this surface area, particle size, packing density and configuration are conventionally varied. However, due to the inherent nature of powder packing, an increase in surface area usually results in an increased air flow resistance. Consequently, there is a natural limitation on the level to which surface areas can be increased while maintaining sufficiently low air flow resistance.

On the other hand, carbon materials of exceptionally high compressive strength are also known for particulate filtering applications, e.g., nuclear contamination or chemically toxic molecules. These are the carbon bonded carbon fiber composites, ceramic bonded ceramic fiber composites or carbon bonded ceramic fiber composites. In such materials, the typical aim is for high compressive strength in combination with high porosity, low air flow resistance, low outgassing, and good thermal insulating properties. However, since particulate filtering is the major application of such composites, the low surface areas involved (typically less than or about 1 $m^2/g$ specific surface area) are acceptable. For a thorough discussion of the preparation and characteristics of such composites, see, e.g., U.S. Pat. Nos. 4,500,328, 4,391,873 and 4,152,482 and "Low Density Carbon Fiber Composites," Reynolds et al, Union Carbide Nuclear Division, Informal Report No. Y/DA-6925, October 1976, whose disclosures are entirely incorporated by reference herein.

Heretofore, it has never been suggested that these carbon-containing composite materials could be exposed to carbon "activation" conditions for increasing surface area and even more certainly there has never been a suggestion that such materials might be successfully exposed to activation treatments while retaining their compressive strength and low air flow resistance. It would be expected that the loss of the significant amount of carbonaceous material needed to achieve the necessary surface area increase to permit the carbon composite to achieve the characteristics necessary in an activated carbon, would have a significant deleterious effect on the structural integrity of the composite thereby significantly lowering its compressive strength and/or increasing air flow resistance due to such structural changes.

For example, in U.S. Pat. No. 4,350,672, column 1, there is reported the development of stresses and/or cracks in binders and possible weakenings of bonds between fibers in the matrix upon attempted modifications of the basic processing conditions and structures in carbon-carbon composites. Note especially lines 37–41. These prior art difficulties contribute to the fact that heretofore such composites have not been utilized in a wide variety of applications.

SUMMARY OF THE INVENTION

It is an object of this invention to provide a carbonaceous material having both high surface area and high compressive strength.

It is another object of this invention to provide such a material which has the basic structure of the mentioned carbon composites.

It is a further object of this invention to provide a process for preparation of such composites, thereby providing an advantageous form of activated carbon.

It is yet a further object of this invention to provide the corresponding methods of filtering, purifying, exchanging, etc., using activated carbon, wherein the unique active carbon of this invention replaces conventional activated carbon.

Upon further study of the specification and appended claims, further objects and advantages of this invention will become apparent to those skilled in the art.

These objects have been attained based on the surprising finding that exposure of the carbon composites of the prior art to activation treatments during the preparation thereof effects the necessary increase in surface area while maintaining of high compressive strength.

In one aspect of this invention, there is provided a carbon bonded carbon fiber composite having a surface area greater than 10 or 100 or 200 or 300 or 400 or 500 or 600 or 700 or 800 or 900 or 1000 $m^2/g$, and a compressive strength of about 80, 90, 110, 120, 130, 140, 150, 160 psi or higher.

In another aspect of this invention, there is provided in a filter or purifying device comprising an activated carbon component, the improvement wherein the activated carbon component is one of this invention.

In yet another aspect of this invention, there is provided a method of filtering or purifying a fluid by passing it through activated carbon, the improvement wherein the activated carbon is that of this invention.

In a further aspect of this invention, there is provided a method for increasing the surface area of a carbon bonded carbon fiber composite while maintaining high compressive strength, comprising exposing the carbon fibers and/or carbon bonding material to a surface activation treatment, preferably, with respect to the fibers, prior to bonding thereof by the carbon bonding material.

DETAILED DISCUSSION

All of the references mentioned above and below are entirely incorporated by reference herein, for their disclosures of prior art characteristics which are applicable to this invention, e.g., nature of the organic fibers and/or resins which can be carbonized to provide the carbon fibers and/or bonding material of this invention, the wide variety of uses to which the activated carbon composite of this invention can be put, the various details of the preparation of carbon bonded carbon fiber composites, e.g., as discussed in the four references cited above in this regard, etc.

Basically, the method for preparing the carbon bonded carbon fiber composites of this invention is the same as that disclosed in detail in these four references except for provision of the surface activation treatment to the carbon fibers and/or carbon bonding material, preferably to both.

The prior art process for composite fabrication esentially comprises three steps: (1) batch preparation, (2) molding, and (3) heat treatment. Preparation of the batch includes: (a) carbonizing and chopping the fibers, and (b) blending the fibers and phenolic resin into a very dilute, homogeneous dispersion of solids in a water slurry. Vacuum filtration is used to form, or mold, the solids onto a mandrel of the desired configuration. Finally, heat-treatment operations, including low-temperature (gelation and drying) and high-temperature (pyrolizing) operations are performed to obtain a carbon-bonded fibrous structure which can then be machined to any desired dimensions. All details of these steps are essentially unchanged from the incorporated prior art descriptions.

Preparation of the carbon fiber for maximum sorptivity can be accomplished as follows, for example. The precursor (10 to 12 micrometers diameter) fibers (rayon, polyacylonitrile, pitch, etc.) are chopped into conventional lengths, e.g., 0.010 to 0.030 inch and then are exposed to 800° to 900° C. in an inert atmosphere. The resultant carbonized fibers are then typically vacuum drawn through a Wiley Mill for separation of fibers which may have clumped or bonded together during the pyrolizing operation. Rayon is generally preferred but any carbonizable fiber can be used. Typically, hard to oxidize fibers will be less preferred than those more easily oxidized, e.g., polyacrylonitrile is typically harder to oxidize than are pitch fibers.

The resultant carbonized fibers are then exposed to oxidizing atmospheres such as $CO_2$, steam, oxygen, air, etc., optionally in the presence of a carrier gas such as argon, nitrogen, etc., (e.g., 1-10 molar % or more of oxidizing gas, preferably $CO_2$, in preferably argon, to ensure good system control, at elevated temperatures, e.g., 500°-1,000° C., typically 500°-850° C. or 600°-800° C. or 750°-800° C. for 0.25-4 hours, preferably about 1-3 hours, especially about 3 hours, the time required to achieve a certain surface area, of course, being inversely related to the oxidizing strength of the atmosphere, e.g., percent of $CO_2$ and the maximum time being determined by the need to avoid destroying or injuring the carbon. These surface activation conditions are not critical and can be routinely modified to optimize and/or maximize the desired surface area, e.g., using conventional considerations, e.g., those discussed in U.S. Pat. Nos. 4,362,646 and 4,285,831 (which disclosures are entirely incorporated by reference herein) as modified by the guidelines provided herein. However, of course, exposure to conditions which are too severe and/or for too long a time can destroy the fibers, e.g., as shown in Comparative Examples A and B below for purposes of illustration. In these tests, the reaction eventually became out of control as the heat of reaction increased. It is further possible to combine the pyrolizing step (fibers and/or resin) and the oxidizing step into one operation, thereby performing them simultaneously. As in the pyrolysis steps per se, it is preferred to maintain pyrolysis temperatures less than 1100°-1300° C., e.g., to use temperatures of about 800°-900° C. at most in order to avoid increasing the fiber or resin resistance to oxidation.

Phenolic resin has been the principal binder utilized in preparing the conventional carbon fiber composites and is preferred over starch and other binders. The characteristics of phenolic resin which make it particularly attractive for composite preparation include: (1) particle sizes of about 10 μm—fine enough to obtain a good dispersion in a fibrous structure, yet not too small to "bind" or inhibit the vacuum-filtration operation; (2) insolubility in water; (3) fluid melt and wetting properties to create effective bonding; (4) low thermoset or cure temperatures without migration to adjoining surfaces, and (5) high carbon yield (50-55 wt %) on pyrolysis.

The composite consists of oriented carbon fibers (typically about 12 vol %) bonded together with a small amount (about 3 vol %) of carbon binder in a highly porous structure (about 85 vol % porosity). (See references above.) The preferred fiber orientation is a result of the vacuum-molding process in which the fibers tend to align randomly in planes normal to the applied force of vacuum. This process can be used to fabricate composites with different fiber orientations and all are included within the scope of this invention.

A water slurry containing carbon fibers and insoluble phenolic resin is prepared and subjected to mechanical agitation typically for approximately 30 minutes. This operation provides additional separation of fiber aggregates and gives a homogeneous dispersion of solids within the liquid. Recylcing of the slurry during mixing is conducted by means of a centrifugal pump which draws the liquid from the bottom of the slurry tank and returns it to the top of the tank. This action assists in minimizing the settling of solids to the bottom of the tank while mixing.

The water slurries are prepared with a low concentration of solids in order to enhance the fiber separation and enable a homogeneous dipsersion of solids to be achieved during the mixing operation. Generally, the total solids content (fiber and resin) of the slurry does not exceed one weight percent. A typical formulation might comprise about 0.35 weight percent of fibers, about 0.35 weight percent of phenolic, and about 99.3 weight percent of filtered process water.

The molding procedure comprises the following operations: (1) filling the molding container with water; (2) starting the pumping of the slurry into the molding vessel, simultaneously applying a vacuum (about 26 inches Hg) inside the perforated mandrel: (3) continuation of slurry feeding into the molding vessel until the slurry tank is depleted, maintaining a head of slurry above the top of the perforated mandrel at all times, (4) continuation of vacuum pumping after all of the solids are deposited on the mandrel, until the desired residual water content within the molding is reached.

Generally, a perforated mandrel, with hole diameters of either 1/16 or ⅛ inch, is used as the substrate for depositing the solids during filtration. Mandrels for any desired filter or other shapes, e.g., flats, cylinders, discs, cones, conical frustra, etc., can be readily fabricated from perforated metal. To prevent fibers and binder from being drawn through the mandrel during filtration, the mandrel is covered with a porous cloth or a felt material. Various weaves of cotton cloth, and rayon or carbon felts in thicknesses up to ¼ inch, can be used for this purpose.

Use of a separate container for the forming operation is desirable for the following reasons: (1) settling of solids in the molding vessel can be minimized by making the vessel as small as possible in relation to the size of the perforated mandrel; and (2) agitation and recycling of the slurry can continue in the tank, thereby maintaining a homogeneous material feed to the molding container.

The residual water content in the molded material, controlled by the dewatering time, is an important variable. An excessive water content will increase the tendency for delaminations (interlaminar separations) to occur during later curing and drying operations due to shrinkage effects and additional migration of the binder to part surfaces. For these reasons, dewatering of moldings is controlled to give a water-to-solids weight ratio of approximately 1 to 1.

Total time required for the molding operation is generally in the range of 5-15 minutes and is primarily dependent on the vacuum capacity of the system, thickness of the molding, and the type and proportion of the solids in the formulation.

Process operations following vacuum molding are performed to effect a semi-rigid, carbon-bonded fibrous structure. Operations include: curing (phenolic flow and rigidification), and pyrolizing (pyrolysis of the phenolic). The molded parts are generally left on the perforated mandrel while curing at 90°-130° C. for 2-4 hours depending on thickness in order to prevent distortions in shape. After curing, the fibers are well bonded and the moldings can be removed from the forming mandrel.

Pyrolysis of the phenolic to obtain a carbon bond is conducted by heating the molding to 600°-900° C. in an inert atmosphere. Since the carbon fibers have been previously heat treated to 600°-900° C., shrinkage during pyrolysis is low, generally on the order of 1-2 percent.

After these conventional aspects (see the mentioned four references), the composite, optionally but preferably, is again exposed to the surface activation treatment under conditions as discussed above. This increases the surface area of the pyrolyzed resin, thereby increasing the overall surface area of the composite, the resin normally comprising about 12.5-20%, generally about 15 wt % of the total.

Throughout the foregoing, equivalents of the preferred carbon bonded carbon fiber composites are the known carbon bonded ceramic fiber composites. However, the total surface areas of the latter cannot attain such high levels since the only carbon components are contributed by the minor amount of resin involved.

Because of the increased surface area of the unique composites of this invention, the latter are highly advantageous for use as replacements for activated carbon in essentially all of its conventional uses. The composites are still highly useful for the applications for which they heretofore have been so advantageous, e.g., filtering of nuclear contaminated particles and/or gases. However, due to the significantly increased surface areas, they can now also be used to very efficiently filter gases including nuclear contaminated gases and chemically toxic gases as well as particulates. Consequently, they will be especially useful in a variety of military applications, as well as industrial applications where protection against chemically toxic gaseous agents (e.g., nerve gases), radioactive gases, contaminated particles, etc., are involved. Moreover, they can function for such purposes even under environmental conditions where significant pressure exposure is likely, e.g., in chemical warfare applications, in situations where blasting or other explosions are likely, in cases where severe weather conditions are likely to occur, e.g., tornados, hurricanes, etc. The heretofore available activated carbon filters, lacking any significant compressive strength, are highly unlikely to survive such situations. On the other hand, the strong composites of this invention can easily survive such catastrophic conditions due to their compressive strengths in excess of, e.g., 100 psi.

Of course, the novel composites of this invention can also be used in the more conventional routine applications wherein activated carbon/charcoal filters have heretofore been utilized, including water filtration/purification wherein the composite of this invention will be machined to an appropriately small thickness to provide the necessary fluid flow, e.g., the composites are readily machinable to thicknesses as small as 0.1 inch or less. They are also useful in conventional stationary or especially portable home or other building air filtering units. A major advantage in such applications is that, unlike the messy and inconvenient particulate carbon filters of the prior art, the composites of this invention can routinely be replaced by simple mechanical manipulation.

Furthermore, of course, they can be utilized in closed systems in order to prevent emanation of undesired gaseous and/or particulate material as discussed above into the atmosphere. Similarly, where desired, the filter, instead of being replaced, can be routinely regenerated as described in prior art applications. However, since the composites are so inexpensive, it would generally be preferred to replace them. Another significant advantage of the composites of this invention is derived from the fact that they have very low dusting characteristics. For example, when subjected to conventional vibration tests, significantly lesser dusting occurs than for conventional activated carbon/charcoal. Tests have shown the composites to be so desirable in this aspect that they can be used in cryogenic helium dewers for space applications.

In all these uses, the ability of the composites to be molded/machined into an unlimited number of geometrical configurations and sizes is a major advantage over normal activated carbon/charcoal systems which are typically formed into a packed bed. As a result of this aspect, the previously noted packing phenomenon does not exist and the composites of this invention maintain their low air flow resistance despite the increased surface areas. For example, air flow values on the order of about 10-20 liters per minutes have been observed at a ΔP of less then 1.0 psi for composites having a thickness on the order of about 0.6 inch with a density of about 0.2 g/cc. While prior art activated carbons may be able to achieve such air flow resistances, the bulk density of the prior art systems is much lower than that of this invention. As a result, per unit volume, there is a much higher absorptivity provided by this invention. This represents a very significant advantage over the prior art.

In general, while not intending to limit the scope of this invention in any way, typical properties can be stated. For a prior art non-oxidized composite having a density of, e.g., 0.3 to 0.05–0.1 g/cc (varied principally by fiber size), after oxidation, the density will typically be lowered by about 30%, e.g., at a final surface area of about 800 m$^2$/g, a starting density of about 0.3 g/cc will become about 0.2–0.24 g/cc. The same starting composite will have compressive strengths of about 150 psi (0.3 g/cc density) to about 25–40 psi (low densities above) and the oxidized versions will have values lower by about 20–30%. Starting porosities (80–90%) will be increased by about 3–5%.

Overall, the composites of this invention represent a major advance in the field of activated carbon/charcoal systems.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLES 1-6

Rayon fibers were carbonized in accordance with the conventional conditions described above and in the above-cited references in argon at 800° C. These fibers had a surface area on the order of about 1 m$^2$/g or less. The fibers were then exposed to the conditions shown in the table below whereupon the surface areas as also shown below were achieved. The argon/$CO_2$ flow rate was 15 liters/minute into a furnace volume of about 45 liters.

| Ex. | Oxidizing Conditions | | | Surface Area (m$^2$/g) |
| --- | --- | --- | --- | --- |
| | Gap Composition | Temp. (°C.) | Time (Hours) | |
| 1 | 1% $CO_2$/99% Ar | 750 | 2 | 132 |
| 2 | 2% $CO_2$/98% Ar | 750 | 2 | 216 |
| 3 | 5% $CO_2$/97% Ar | 750 | 2 | 412 |
| A | 10% $CO_2$/90% Ar | 750 | 2 | Fiber Ruined |
| B | 10% $CO_2$/90% Ar | 750 | 1 | Fiber Ruined |
| 4 | 10% $CO_2$/90% Ar | 750 | 0.5 | 667 |
| 5 | 5% $CO_2$/95% Ar | 750 | 3 | 700 |
| 6 | 5% $CO_2$/95% Ar | 800 | 3 | 800 |

EXAMPLE 7

Fibers prepared in accordance with Examples 1-6 and having a surface area of 216 m$^2$/g were used to prepare a composite. Using the fully conventional procedures described above and in the above-cited references, fibers were combined with phenolic resin which was carbonized at 750° C. for 3 hours under a 100% argon atmosphere. The proportion of phenolic resin before carbonization was 33%. Carbonization under these conditions yielded a composite wherein the phenolic resin component contributed 15% of its total carbon content. That is, as is typical, about 50% of the starting resin (usually about 30–33 wt %, but more broadly about 10–40 wt % typically) is carbonized and the remainder volatilized. After the carbonization treatment, the specific surface area of the total composite was 113 m$^2$/g, a decrease from that of the starting fibers. The thus-produced composite was then exposed to oxidizing conditions of 2% $CO_2$/98% Ar at 750° C. for 2 hours. The resultant surface area of the composite was 250 m$^2$/g, a significant increase over that of the starting material fibers. The composite had a porosity of 80–85%, a density of 0.24 g/cc and a compressive strength of 140 psi.

EXAMPLE 8

As described in Example 7, starting material fibers having a surface area of 600 m$^2$/g were used to form a composite with phenolic resin. Under the same conditions described in Example 7, a composite of 33% phenolic resin (15% by weight of the eventual total carbon content) was produced having a surface area of 448 m$^2$/g, again lower than that of the fibers. The resultant composite was exposed to the same oxidizing conditions as in Example 7 except for 3 hours. The resultant surface area was 700 m$^2$/g, again a significant improvement over that of the starting material fibers. The resultant porosity was 85–90%, the density was 0.15 g/cc and the compressive strength was 90 psi.

EXAMPLE 9

The high surface area composite of Example 8 was subjected to a conventional air resistance test. The air flow through this material (1×1×0.6 inch) was about 20 liters per minute at a pressure differential of 1 psi. Its filtering efficiency for 0.3 micrometer dioctyphthalate particles was greater than 99.97%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A carbon bonded carbon fiber composite having a surface area greater than about 10 m$^2$/g, and a compressive strength of about 20 psi or higher.

2. A carbon bonded carbon fiber composite having a surface area greater than about 100 m$^2$/g, and a compressive strength of about 100 psi or higher.

3. A composite of claim 1, having a surface area of 600–1,000 m$^2$/g and a compressive strength of about 100–145 psi.

4. A composite of claim 1, having a surface area of 600–800 m$^2$/g and a compressive strength of about 100–140 psi.

5. A composite of claim 2, wherein the carbon fibers are derived from carbonization of polyacrylonitrile fibers, rayon fibers or pitch fibers.

6. A composite of claim 3, wherein the carbon which bonds the carbon fibers is derived from carbonization of a phenolic resin.

7. A composite of claim 5, wherein the carbon which bonds the carbon fibers is derived from carbonization of a phenolic resin.

8. A composite of claim 2, wherein the carbon fibers have been exposed to a surface activation treatment.

9. A composite of claim 2, wherein both the carbon fibers and the carbon bonding material have been exposed to a surface activation treatment.

10. A composite of claim 8, wherein said treatment comprises exposure of the fibers to carbon dioxide or steam at an elevated temperature effective to increase the surface area thereof.

11. A composite of claim 9, wherein said treatment comprises exposure of the fibers and carbon bonding material to carbon dioxide or steam at an elevated temperature effective to increase the surface area thereof.

12. A composite of claim 1, wherein both the carbon fibers and the carbon bonding material have been exposed to a surface activation treatment comprising exposure of the fibers and carbon bonding material to carbon dioxide or steam at an elevated temperature effective to increase the surface area thereof.

13. In a carbon bonded carbon fiber composite having a surface area of about 1 $m^2/g$ and a compressive strength of about 20 psi or higher, the improvement wherein the composite is exposed to a surface activation treatment, during or after its preparation, whereby its surface area is increased to greater than about 10 $m^2/g$ and its compressive strength remains substantially unchanged.

14. In a carbon bonded ceramic fiber composite having a certain surface area and compressive strength, the improvement wherein the composite is exposed to surface activation treatment, during or after its preparation, whereby its surface area is increased by at least an order of magnitude and its compressive strength remains substantially unchanged.

* * * * *